(12) United States Patent
Kraus et al.

(10) Patent No.: US 7,194,851 B2
(45) Date of Patent: Mar. 27, 2007

(54) STEAM INJECTION MANIFOLD ARRANGEMENT HAVING STEAM DISCHARGE ORIFICE ARRANGEMENT ADJUSTABLE TO VARY DISCHARGE WIDTH

(75) Inventors: Timothy James Kraus, Hedrick, IA (US); Randall John Rigdon, Dunkerton, IA (US); Daniel James Meyer, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/152,906

(22) Filed: Jun. 15, 2005

(65) Prior Publication Data

US 2006/0283165 A1 Dec. 21, 2006

(51) Int. Cl.
*A01D 39/00* (2006.01)
*A01D 43/02* (2006.01)
*A01D 75/00* (2006.01)

(52) U.S. Cl. .......................... 56/341; 100/74

(58) Field of Classification Search .................. 56/341, 56/16.8, 16.4 R; 100/74, 73, 88, 71
See application file for complete search history.

(56) References Cited

U.S. PATENT DOCUMENTS

| | | | | |
|---|---|---|---|---|
| 3,280,543 A | * | 10/1966 | Stanley et al. | 56/16.4 D |
| 3,585,730 A | * | 6/1971 | Morse | 34/418 |
| 4,228,638 A | * | 10/1980 | Rabe et al. | 56/341 |
| 4,327,537 A | * | 5/1982 | Wolrab | 56/1 |
| 4,352,267 A | * | 10/1982 | Mellinger | 56/341 |
| 4,550,556 A | * | 11/1985 | Meiners | 56/341 |
| 4,916,888 A | * | 4/1990 | Sheehan et al. | 56/14.7 |
| 4,918,910 A | * | 4/1990 | Sheehan et al. | 56/341 |
| 5,758,479 A | * | 6/1998 | Staheli | 56/16.4 R |

* cited by examiner

*Primary Examiner*—Árpád Fábián Kovács

(57) ABSTRACT

A baler is equipped with a crop re-hydration system including a steam injection manifold mounted for discharging steam onto a windrow of crop as the windrow is being fed into the baler. The steam injection manifold has a steam discharge orifice arrangement which can be adjusted to vary the discharge width. A flexible duct guides discharged steam to the crop windrow.

12 Claims, 4 Drawing Sheets

US 7,194,851 B2

STEAM INJECTION MANIFOLD ARRANGEMENT HAVING STEAM DISCHARGE ORIFICE ARRANGEMENT ADJUSTABLE TO VARY DISCHARGE WIDTH

FIELD OF THE INVENTION

The present invention relates to a large square baler equipped with a crop re-hydration system, and, more particularly, relates to a steam injection manifold arrangement of the re-hydration system.

BACKGROUND OF THE INVENTION

Crop re-hydration systems for use with a large square baler are known which include a plurality of steam injection manifolds strategically located so that steam is injected into the top and bottom of a windrow of crop being lifted and fed into the baler so that steam comes into contact with the surface of the individual parts of crop being re-hydrated. At least one of these steam injection manifolds is exposed to wind currents which would adversely affect the application of steam to the top of the windrow. Further, it is current practice to construct the manifold so as to have a length sufficient for applying steam to the entire width of the a windrow having a maximum width that can be efficiently picked up by the baler pick-up. Therefore, when the windrow is narrower than this maximum width steam exiting through injection nozzles outside the width of the windrow will be wasted. In an attempt to prevent the distribution of steam from being adversely affected by wind and to make use of steam which exits outside the width of the windrow, it is known to provide a housing of flexible material having a top wall which extends above the steam injector manifold and having a vertical wall which wraps around opposite ends of the crop pick-up and terminates in a bottom edge that is close to the ground.

The known flexible housing performs its intended function of blocking the wind but does not operate to cause the steam, which exits outside the width of a given windrow, to be directed onto the crop contained in the windrow.

Therefore, the problem to be solved is to provide a steam injection manifold that overcomes the above-noted problems of the prior art.

SUMMARY OF THE INVENTION

According to the present invention, there is provided a novel steam injection manifold.

An object of the invention is to provide a steam injection manifold, for use with a crop re-hydration system used for treating crop being baled, which is adjustable in width so that it can be matched to the width of a windrow being picked up by the baler pick-up.

DESCRIPTION OF THE PREFERRED EMBODIMENT

Figure 1:
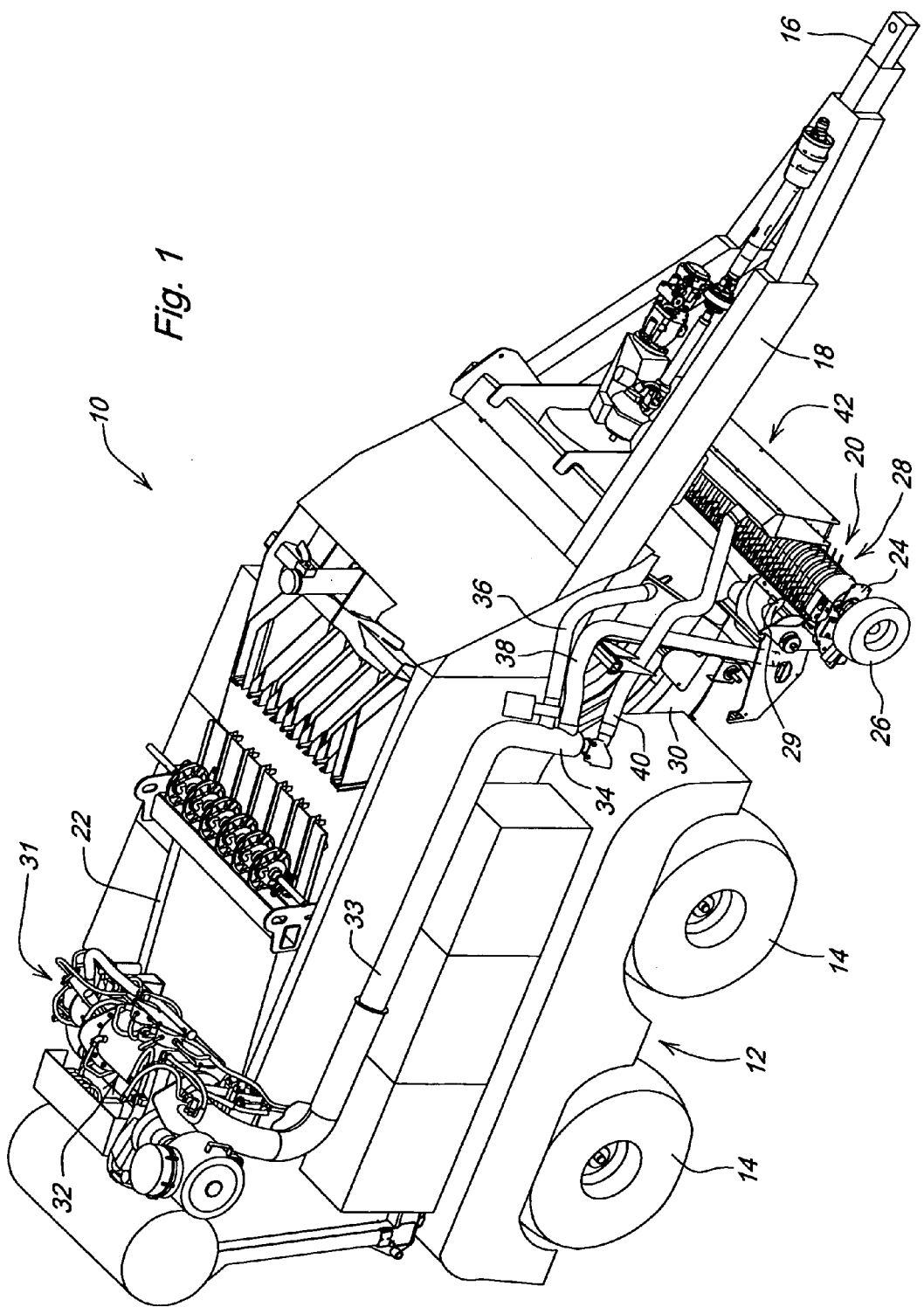
FIG. 1 is a right front perspective view of a large square baler equipped with a crop re-hydration system of which only a forward steam injection manifold is shown.

Referring to FIG. 1, there is shown a large square baler 10 including a main frame 12 supported on a tandem set of wheels 14 for being towed over the ground by a tractor (not shown) coupled to a hitch 16 provided at a forward end of a drawbar structure 18 fixed to, and converging forwardly from, the main frame 12.

A crop pick-up 20, which is wider than a longitudinally extending baling chamber 22, defined by the frame 12, is located beneath the converging drawbar structure 18 and is suspended from a forward region of the frame 12. The pick-up 20 includes a frame 24 having opposite ends to which are respectively coupled a pair of gauge wheels 26 that engage the ground when the pick-up is lowered for operation. A tined reel 28 includes a center shaft (not shown) having opposite ends mounted to the frame 24 for rotation. A drive arrangement (not shown) is coupled for effecting rotation of the reel 28 so that a windrow of crop is elevated from the ground and delivered rearwardly where a pair of converging augers 29 located at opposite sides of the baler act to narrow the crop flow to a width commensurate with that of an upwardly and rearwardly curved duct 30 that guides crop to an inlet opening provided in a bottom wall of the baling chamber 22. Once moved into the baling chamber 22, the crop is compressed to form a bale, in a manner well known in the art.

Mounted to the baler 10 is a crop re-hydration system 31 including a direct-fired steam generator 32 having an outlet coupled to a main steam distribution conduit 33 supported at a right-hand side of the baling chamber 22. A forward end of the conduit 33 defines a vertical steam distribution manifold 34 to which is coupled upper, middle and lower steam distribution conduits 36, 38 and 40, respectively. Each of the conduits 36, 38 and 40 leads to a steam injection manifold arrangement, with only a steam injection manifold arrangement 42, that is coupled to the lower steam distribution conduit 40, being described.

Figure 2:
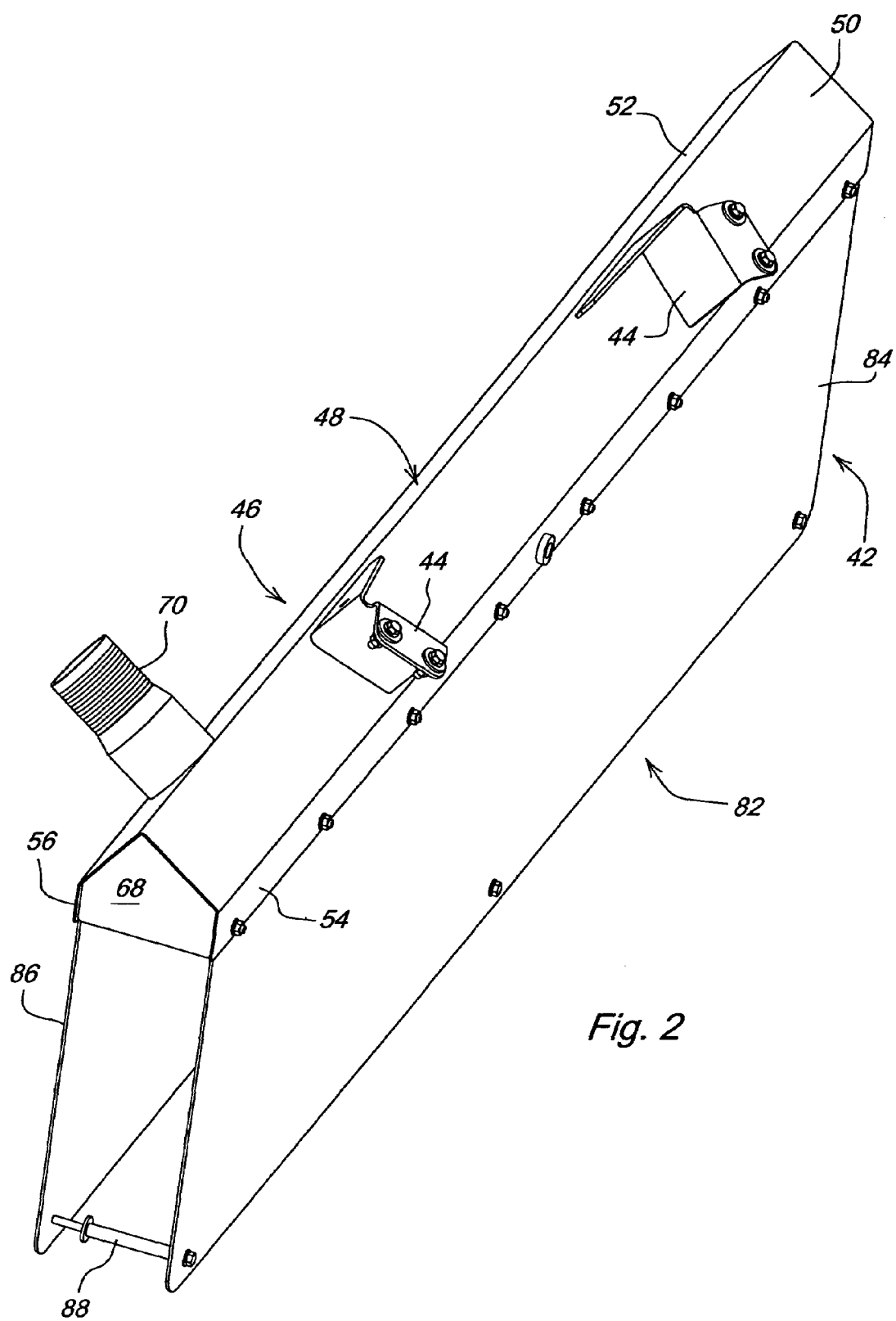
FIG. 2 is a right front perspective view of the steam injection manifold shown in FIG. 1.
Figure 3:
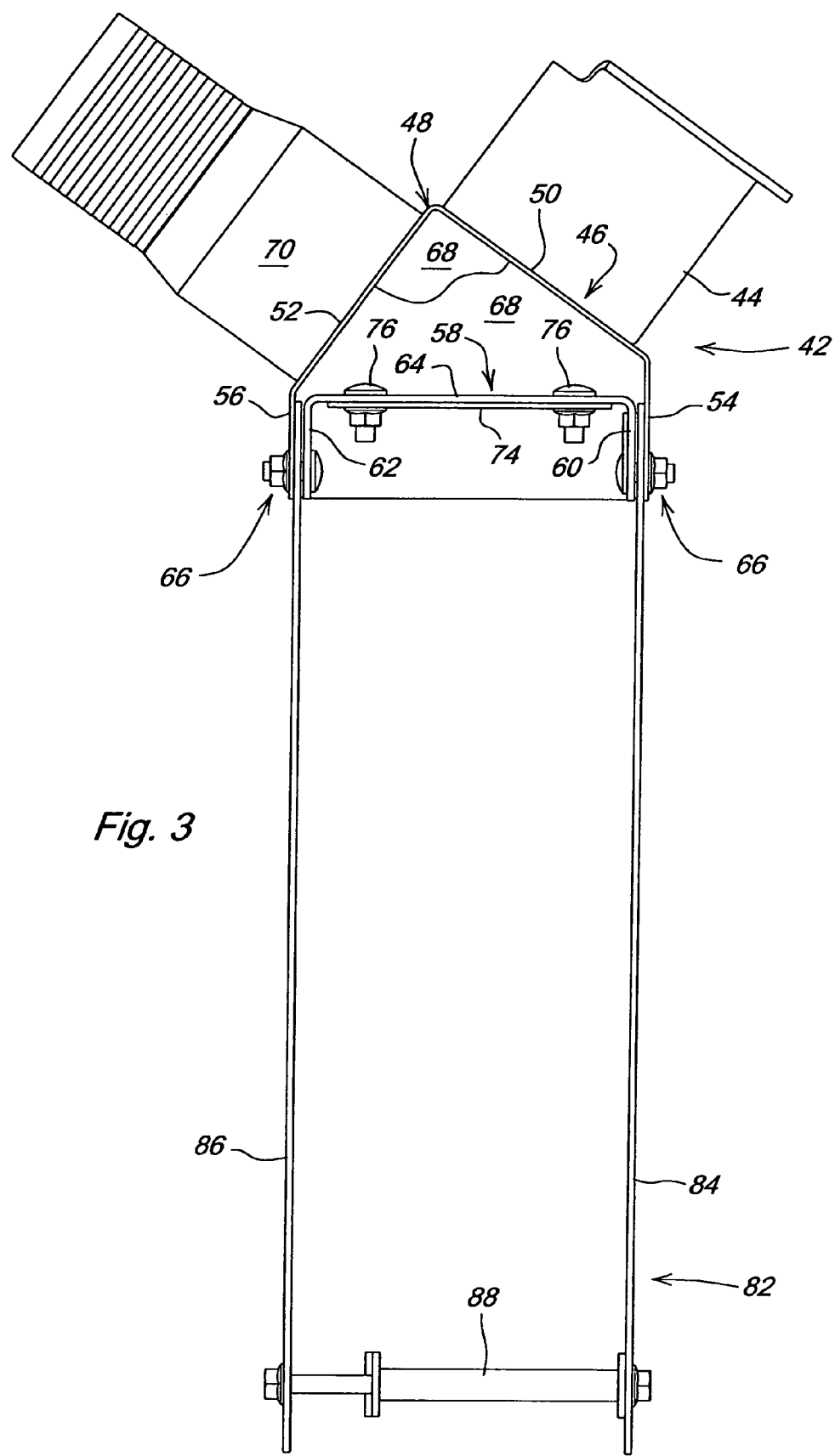
FIG. 3 is a right end view of the steam injection manifold shown in FIG. 2, but with the right end wall being broken away.

Referring now also to FIGS. 2 and 3, it can be seen that the steam injection manifold arrangement 42 extends transversely below, and is mounted, as by a pair of supports 44, to the forwardly converging drawbar structure 18 of the baler frame 12. The manifold arrangement 42 includes a tubular manifold body 46 comprising a unitary member 48 constructed of sheet metal formed to define a top having rectangular front and rear sections 50 and 52, which diverge downwardly and form an included angle of 90°. Lower ends of the front and rear sections 50 and 52 are respectively joined to vertical front and rear sections 54 and 56. The pair of supports 44 have respective lower ends fixed to an upper surface of the top front section 50. Forming a bottom of the manifold body 46 is an inverted U-shaped channel member 58 having vertical, front and rear sides 60 and 62, respectively, joined together by a horizontal section 64. The front and rear sides 60 and 62 are respectively disposed in close, parallel relationship to a rear surface of the vertical front section 54 of the member 48, and to a front surface of the vertical rear section 56 of the member 48. A plurality of bolt and nut assemblies 66 are each provided at aligned sets of holes provided in the vertical front section 54 and front side 60, and in the vertical rear section 56 and rear side 62 for securing the channel member 56 to the unitary member 46.

Opposite ends of the manifold body 46 are defined by end plates 68. Steam enters the manifold body 46 by way of a tubular fitting 70 welded within a circular hole provided in the top rear section 52 of the unitary member 48 at a location spaced a short distance from the right-hand end of the manifold arrangement 42. A forward end section of the steam distribution conduit 54 receives and is clamped onto the tubular fitting 70.

Figure 4:
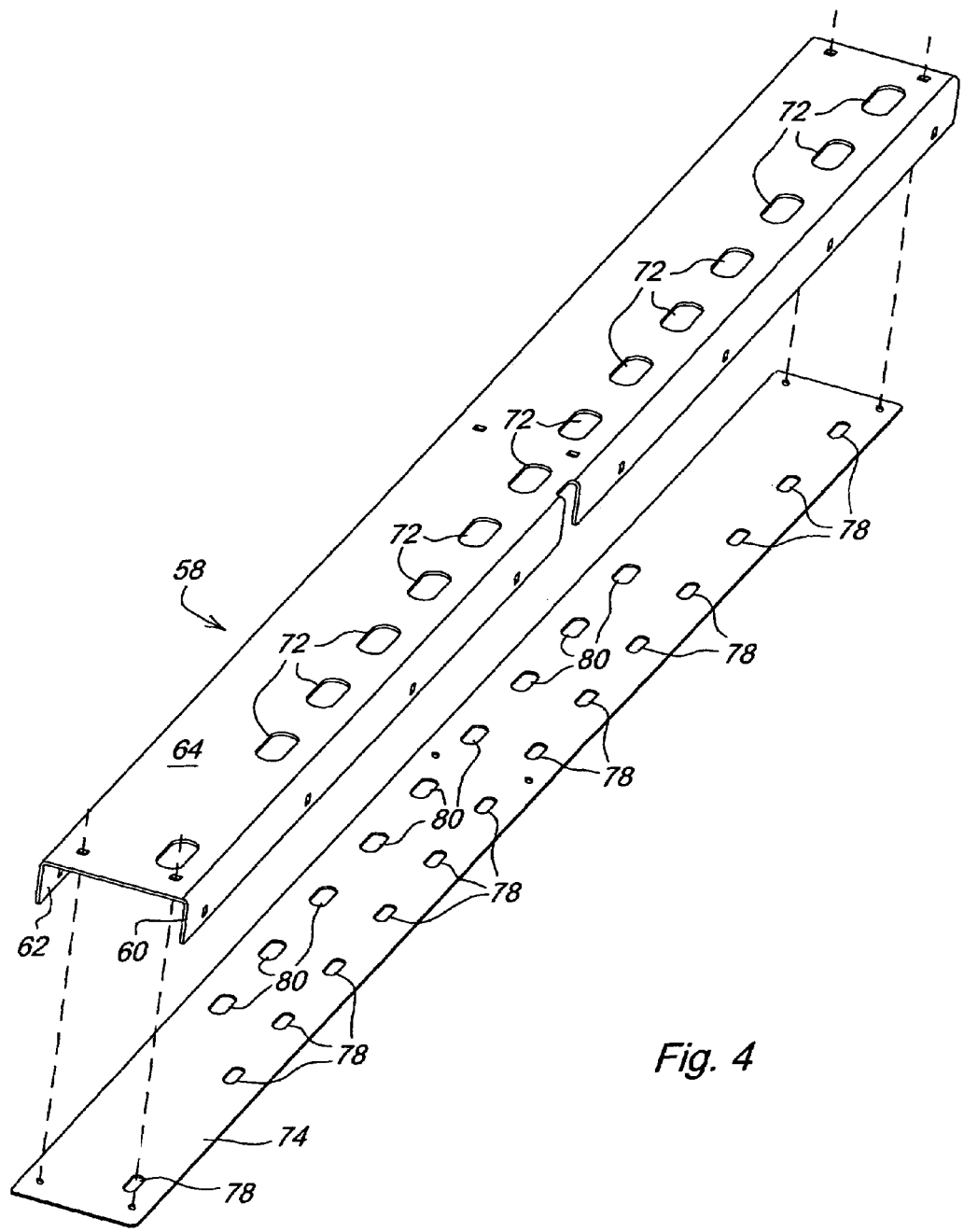
FIG. 4 is an exploded perspective view showing the bottom wall of the steam injection manifold together with the orifice plate.

As can be seen in FIG. 4, a plurality of steam discharge openings 72 are arranged in a row, which extends lengthwise in the horizontal section 64 of the channel member 58, and define an exit for steam to leave the manifold body 46. To regulate the distribution of steam from the manifold body 46, a rectangular orifice plate 74 is bolted against a bottom surface of the horizontal section 64 by a plurality of nut and bolt assemblies 76. The orifice plate 74 is provided with parallel first and second rows of steam outlet orifices 78 and 80, respectively, which extend lengthwise of the orifice plate 74, with the first row of outlet orifices 78 extending the full length of the orifice plate, and with the second row of outlet orifices 80 being centered between opposite ends of the manifold body 46 and extending only part way along the length of the orifice plate.

When the orifice plate 74 is mounted in the position shown, the first row of outlet orifices 78 are respectively in alignment with the plurality of openings 72 contained in the horizontal section 64 of the channel member 58, while the second row of outlet orifices 80 are masked or closed by the horizontal section 64 of the channel member 58. This establishes a condition for applying steam to a crop windrow having a width commensurate with the width of the manifold body 46.

The orifice plate 74 will be placed with the second row of outlet orifices 80 in register with respective ones of the discharge openings 72 when the windrow of crop is somewhat narrower than the width of the manifold body 46. It is here noted that the second row of outlet holes 80 are sized larger than the first row of outlet orifices 78 so that the total area of the holes 78 is equal to the total area of the orifices 80. In this way, no matter which set of orifices is selected for distributing steam onto the windrow of crop, the total open area of the orifices remains constant so as to insure equal steam distribution to other steam injection manifolds and to maintain a constant back pressure in the steam distribution system. The openings 72 in the channel member 58 and/or the outlet holes in the orifice plate 74 can have other shapes and patterns with the only requirements being that the outlet holes must be arranged so that two sets having different effective widths must result, with one set being masked off or closed by the channel member 58 when the other set is chosen for operation.

Adverse affects of wind to steam distribution are minimized by a flexible duct arrangement 82 including, front and rear rectangular panels 84 and 86, respectively, extending the full length of the manifold arrangement 42, with the front panel 84 having an upper portion clamped between the vertical front section 54 of the unitary member 48 and the front side 60 of the channel member 58 by the bolt and nut assemblies 66 at the front of the manifold arrangement 42, and with the rear panel 86 having an upper portion clamped between the vertical rear section 56 of the unitary member 48 and the rear side 62 of the channel member 58 by the bolt and nut assemblies 66 at the rear of the manifold arrangement 42. The flexible panels 84 and 86 may be constructed of a rubber material or a durable plastic material, for example, with the upper portions serving to provide a seal for preventing steam from exiting the manifold body 46 other than through the selected one of the rows of outlet orifices 78 or 80. The panels 84 and 86 are sufficiently flexible so that they do not cause damage to the windrow of crop as the windrow passes beneath the duct arrangement 82, and are sufficiently durable so that they are not damaged when they pass over obstructions. The front panel 84 is prevented from being dragged into contact with the rear panel 86 by the passing crop by a plurality of horizontal, length-adjustable, spacer rods 88 coupled between lower portions of the panels 84 and 86.

It will be appreciated that the panels 84 and 86 are located so as to not block the pick-up and further crop feeding elements from the view of the tractor operator so that feeding problems will be easily discerned so that action may be taken to correct the problems before plugging results.

The operation of the manifold arrangement 42 is thought evident from the foregoing description. Suffice it to say that the steam outlet openings 72 in the manifold body 48 cooperate with the selected sets of orifices 78 or 80 in the orifice plate 74 to define a steam injection passage arrangement distributed across the width of the manifold arrangement 42 so as to make it possible to efficiently utilize the generated steam by matching the discharge width to the width of the crop windrow. Further the flexible duct arrangement 82 guides the discharged steam to the windrow being picked up by the baler 10 without damaging the crop and without blocking the view of the operator to the crop feeding elements at the front of the baler.

Having described the preferred embodiment, it will become apparent that various modifications can be made without departing from the scope of the invention as defined in the accompanying claims.

The invention claimed is:

1. In a combination of a baler for making large parallelepiped bales and a steam generator carried by the baler for treating crop during the baling process and including a steam injection manifold arrangement located for applying steam to a windrow of crop being elevated into the baler by a pick-up, the improvement comprising: said steam injection manifold arrangement including an elongate hollow manifold body extending transversely to a direction of travel of said baler; said manifold body including a steam injection passage arrangement distributed across its width and being adjustable to vary the effective width of the steam injection passage arrangement.

2. The combination, as defined in claim 1, wherein said manifold body includes a wall disposed adjacent a path followed by said crop windrow as it is being elevated into said baler; said steam injection passage arrangement including a discharge opening arrangement being provided in said wall for permitting the passage of steam; an orifice plate being mounted to said wall; said steam injection passage arrangement further including first and second sets of orifices provided in said orifice plate, with said first set of orifices being located so as to register with said opening arrangement for defining a first effective width for the discharge of steam from said manifold body when said orifice plate is in a first position relative to said wall, and with said second set of orifices being located so as to register with said opening arrangement for defining a second effective width less than said first effective width when said orifice plate is in a second position relative to said wall; and said wall closing said second set of orifices when said orifice plate is in said first position relative to said wall, and said wall closing said first set of orifices when said orifice plate is in said second position relative to said wall.

3. The combination, as defined in claim 2, wherein said wall defines a bottom of said manifold body.

4. The combination, as defined in claim 2, wherein said opening arrangement in said wall is defined by an elongate slot extending approximately an entire length of said wall; and said first and second sets of orifices each including a plurality of orifices arranged along a line extending lengthwise of said orifice plate.

5. The combination, as defined in claim 2, wherein said first set of orifices have a combined cross sectional area approximately equal to that of said second set of orifices.

6. The combination, as defined in claim 1, and further including a flexible duct arrangement comprising a front vertical panel mounted to a front side of said manifold body and a rear vertical panel mounted to a rear side of said manifold body.

7. The combination, as defined in claim 6, wherein said duct arrangement includes spacers mounted between said front and rear panels so as to maintain a spacing between them.

8. The combination, as defined in claim 2, and further including a flexible duct arrangement comprising a front vertical panel mounted to said manifold body at a front side of said bottom, and a rear vertical panel mounted to said manifold body at a rear side of said bottom.

9. The combination, as defined in claim 2, wherein said wall is substantially horizontal.

10. The combination, as defined in claim 1, wherein said manifold body includes a unitary member formed to define top front and rear sections which diverge downwardly and are respectively joined to front and rear substantially vertical sections; an inverted U-shaped channel member having vertical front and rear sides respectively fixed to said front and rear substantially vertical sections of said unitary member, with said wall being defined by channel section extending between and joined to said front and rear sides.

11. The combination, as defined in claim 10, wherein said injection manifold assembly includes a duct arrangement comprising front and rear flexible panels having respective upper portions clamped between said vertical front side and said front section, and between said vertical rear side and said rear section.

12. The combination, as defined in claim 11, wherein a spacer arrangement is mounted between said front and rear flexible panels to maintain a spacing between them during operation.

* * * * *